United States Patent [19]
Fisher et al.

[11] 3,917,509
[45] Nov. 4, 1975

[54] THERMIONIC NUCLEAR REACTOR WITH INTERNAL HEAT DISTRIBUTION AND MULTIPLE DUCT COOLING

[75] Inventors: Colin R. Fisher, La Jolla; Louis W. Perry, Jr., Rancho Santa Fe, both of Calif.

[73] Assignee: The United States of America as represented by The United States Energy Research & Development Administration, Washington, D.C.

[22] Filed: Apr. 16, 1974

[21] Appl. No.: 461,473

Related U.S. Application Data

[63] Continuation-in-part of Ser. No. 306,483, Nov. 14, 1972, abandoned.

[52] U.S. Cl. .................. 176/39; 176/51; 176/61
[51] Int. Cl.² ........................................ G21C 15/02
[58] Field of Search ............ 176/33, 39, 51, 61, 68; 310/4

[56] References Cited
UNITED STATES PATENTS

| | | | |
|---|---|---|---|
| 3,113,091 | 12/1963 | Rasor et al. | 176/39 |
| 3,211,930 | 10/1965 | Clement et al. | 310/4 |
| 3,547,778 | 12/1970 | Flaherty et al. | 176/39 |
| 3,668,070 | 6/1972 | Fiebelmann et al. | 176/39 |

*Primary Examiner*—Harvey E. Behrend
*Attorney, Agent, or Firm*—John A. Horan; F. A. Robertson; John H. G. Wallace

[57] ABSTRACT

A Thermionic Nuclear Reactor having multiple ribbon-like coolant ducts passing through the core, intertwined among the thermionic fuel elements to provide independent cooling paths. Heat pipes are disposed in the core between and adjacent to the thermionic fuel elements and the ribbon ducting, for the purpose of more uniformly distributing the heat of fission among the thermionic fuel elements and the ducts.

1 Claim, 6 Drawing Figures

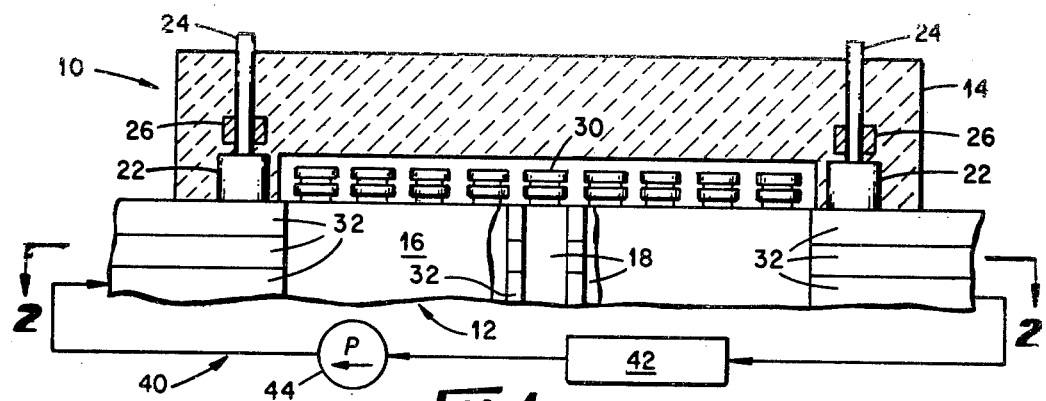
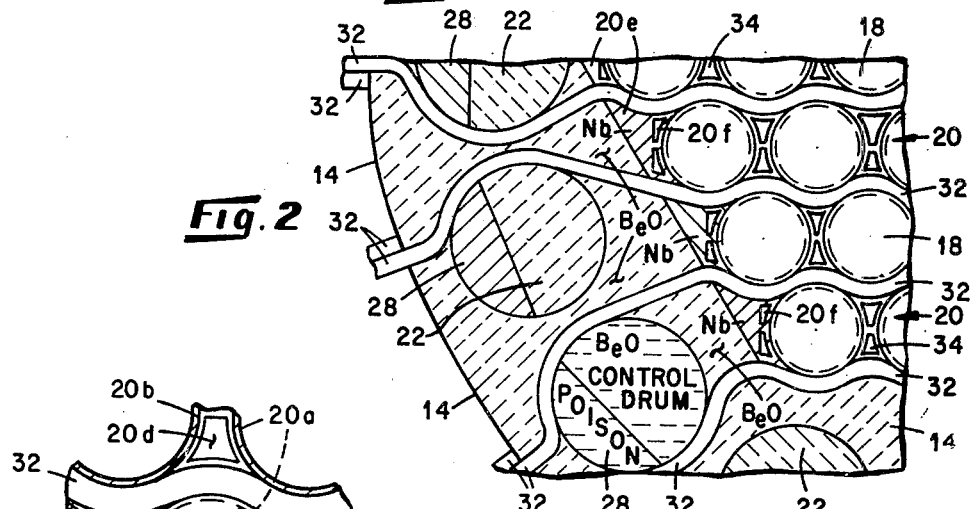
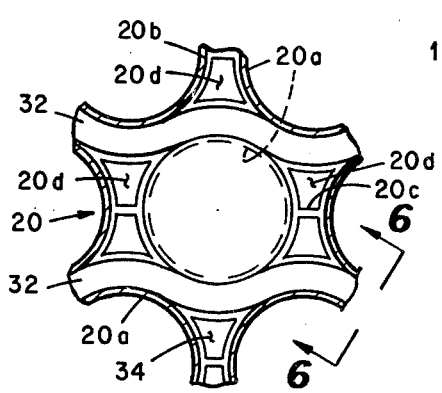
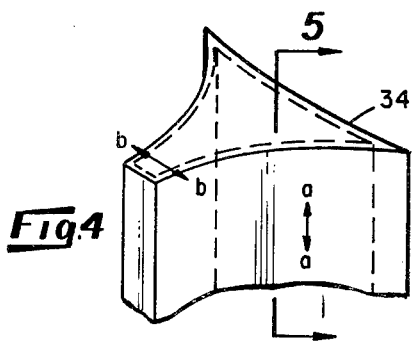
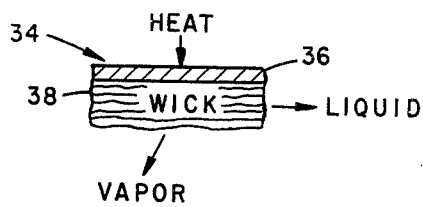

THERMIONIC NUCLEAR REACTOR WITH INTERNAL HEAT DISTRIBUTION AND MULTIPLE DUCT COOLING

BACKGROUND OF THE INVENTION

The invention described herein was made during the course of, or under, Contract No. AT(04-3)-167, Project Agreement No. 14 with the United States Atomic Energy Commission.

This application is a continuation-in-part of application Ser. No. 306,483, filed Nov. 14, 1972 now abandoned.

This invention relates to nuclear reactors. In particular, the invention relates to nuclear reactors of the thermionic type in which electrical power is produced by thermionic emission of electrons from a hot emitter to a cooler collector, the emitter being heated by the fission of nuclear fuel containing a fissionable isotope, commonly U-235. In such reactors the nuclear fuel is contained within each cell of a large number of cells assembled within the core of the reactor to form a potentially critical mass. The cells are electrically interconnected by appropriate conductors to supply the aggregate electrical output of the reactor. As in all reactors, suitable control means are provided to permit the onset and the control of criticality and fission, and to arrest the reaction whenever desired.

A prime requisite in the design of a thermionic nuclear reactor is the provision of means for cooling the reactor, i.e., means for rejecting the heat of the nuclear reaction beyond that which can be converted into electrical energy. A further requisite is the necessity of insuring against the possibility of failure of the cooling system, and it is the practice to do this by the exercise of great care in the design and construction of the reactor and its components. Nevertheless, further means of insuring the utmost reliability are continually being sought. A further problem in thermionic reactors is presented by the desirability of distributing the heat of the nuclear reaction uniformly among the thermionic cells in order to reduce the temperature variations that occur due to variations of heat conduction in the core matrix between the cells and the coolant passages.

SUMMARY OF THE INVENTION

In the thermionic nuclear reactor of the present invention, the core consists of an array of thermionic cells grouped in a layer or module, one or more of such layers being disposed within the core of the reactor. Ribbon-like ducts, rectangular in cross-section, are interlaced among the cells, transversely of the core, each duct constituting a separate coolant flow path in one of a plurality of cooling systems, giving the reliability inherent in a large number of coolant circuits, in which the failure of one coolant circuit will not affect the functioning of the other coolant circuits. In the matrix, between the cells and the coolant ducts, are disposed a large number of individual heat pipes for the purpose of reducing the temperature variations among the cells occasioned by the variations in heat conduction, and for assisting in the conduction of heat to the coolant ducts.

It is therefore an object of the invention to provide a thermionic nuclear reactor having a multiplicity of separate coolant ducts passing through the reactor core.

It is a further object of the invention to provide a thermionic nuclear reactor having means disposed within the core for more readily and uniformly conducting therewithin the heat generated in the core.

These and other objects of the invention will be apparent as the description of the invention proceeds, and from the appended claims.

DESCRIPTION OF THE DRAWING

FIG. 1 is a schematic representation of the upper portion of a thermionic nuclear reactor according to the invention, depicting a cross-section with the core partly in elevation and partly broken away to show the disposition of the thermionic cells, the coolant ducts and the way in which the ducts are connected in heat rejection loops.

FIG. 2 is a portion of a cross-section of the reactor of FIG. 1 taken along the line 2—2 in that figure, the thermionic cells being indicated in position but not shown in cross-section.

FIG. 3 is an enlarged fragment of the cross-sectional view of FIG. 2, showing a portion of the matrix and associated core structure.

FIG. 4 is an enlarged view of the upper portion of one of the heat pipes shown inserted in the matrix in FIG. 2.

FIG. 5 shows a schematic cross-sectional view of a portion of the side wall of the heat pipe insert of FIG. 4, taken along the line 5—5 in that figure.

FIG. 6 shows a cross-sectional view of one of the coolant ducts taken along the line 6—6 in FIG. 3.

DESCRIPTION OF A PREFERRED EMBODIMENT

Referring to FIG. 1, a thermionic nuclear reactor 10 is provided with a core 12, enclosed by a reflector 14, typically of beryllium oxide. The core 12 is provided with one or more layers 16 of thermionic nuclear fuel cells 18, of any suitable construction well known to those skilled in the art. The layers 16 and the cells 18 are supported by a matrix 20, typically of niobium and seen in FIGS. 2 and 3.

Included in the matrix 20 are niobium tubes 20a, for receiving the cells 18, and contiguous niobium hourglass sections 20b, the latter being divided by a septum 20c into two similar bores 20d for receiving inserted heat pipes 34 of mating cross-section. Also included in the matrix, at the outer periphery of the core 16, are niobium boundary blocks 20e, fitting contiguously with the inner periphery of the reflector and with a portion of the periphery of adjacent tubes 20a. The matrix boundary blocks 20e are provided with bores 20f for receiving correspondingly shaped heat pipes, similar to heat pipes 34.

Each of the cells 18 contains the usual emitter and collector structures together with a quantity of nuclear fuel, typically U-235, the amount of fuel in each cell, the number of cells in each layer, the number of layers and the disposition of cells in the core aggregating a potentially critical mass of fissionable material, which can become critical as desired, upon the actuation of appropriate control means.

The control means in the reactor depicted consists of rotatable control drums 22, mounted upon actuating shafts 24, journaled in suitable bearings 26 and disposed in the side wall of the reflector 14 about the core 12. Such control drums are well known to those skilled in the art and, typically, will consist of a cylindrical billet of beryllium oxide nuclear reflector material having, as shown in FIG. 2, an inserted full length segment 28 of boron carbide neutron poison. As is well known in the art, when the drums are rotated so that the segments of poison material are presented to the core, the self-sustaining fission chain reaction ceases and the reactor shuts down, and when the drums are rotated so that their beryllium oxide portion is presented toward the core, the reactor becomes critical, the heat of nuclear fission heats the emitters of the thermionic cells, and electric power is generated upon the closure of the electrical circuitry to which the terminals 30 of the cells are connected by suitable electrical buses, not shown.

Excess heat of nuclear fission, i.e., heat not converted to electricity, is removed from the reactor by means of a coolant fluid, preferably sodium or NaK, passed through the core in a multiplicity of separate niobium ribbon ducts 32 of narrow rectangular cross-section, interlaced among the thermionic cells 18 in a sinusoidal or serpentine fashion for cooling of the cells and matrix, as seen in FIG. 2. The ducts 32 are emplaced throughout the core, from top to bottom as shown in FIG. 1 and from side to side as shown in FIG. 2, in contiguity with the cell tubes 20a and the matrix hour glass sections 20b and boundary blocks 20e. Each duct is a part of one of many separate coolant circuits, hence the loss of coolant in one ribbon duct will not affect the operation of the separate ribbon ducts and will not result in the inoperability of or damage to the reactor. In FIG. 1 there is shown schematically the manner in which each ribbon duct 32 may be connected in a heat rejection loop 40 including a radiator or heat exchanger 42 and a pump 44.

In order to distribute the heat of fission more uniformly through the core, along the thermionic cells 18 and to the coolant ducts 32, heat pipes 34 are inserted in the matrix 20 between the cells and the coolant ducts and are bonded to the matrix. As shown in FIGS. 2 through 5, the heat pipes 34 are sealed tubes of a suitable metallic material such as niobium, are of a length equal to that of the height of the layers 16 and tubes 20a within which the cells 18 are emplaced, and are of curvilinear trapezoidal cross-section and occupy similarly shaped channels in the matrix 20. Each heat pipe 34 has sealed within it a quantity of a heat transporting substance, typically, a suitable metal such as sodium, which will melt and vaporize at the upper temperatures of the adjacent matrix and core structure and will condense at the lower temperatures of the adjacent matrix and core structure. As seen in FIG. 5, the side wall 36 of the heat pipe 34 is lined with a metallic wicking 38 for capillary pumping action to return the condensed liquid to a hotter region of the side wall for revaporization. Because each heat pipe is a sealed unit, the loss of heat transfer fluid from one will not materially affect the performance of any other heat pipe. In the nature of heat pipes, the heat pipes shown herein will not only transfer heat along the length of the cells 18, in the direction $a$—$a$ in FIG. 4, but will also transfer heat along a short transverse path from cusp to cusp along the direction $b$—$b$. The heat pipe thus will very effectively transfer heat to the adjacent ducts from the matrix portions not directly in contact with the ducts. A good thermal bond is assured by brazing together, as a unitary assembly, the matrix elements, ducts, cell tubes and heat pipes.

What we claim is:

1. In a thermionic nuclear reactor, the combination of:

a core defined by side, top and bottom boundaries and containing fissionable material;

a reflector about said core;

a matrix for said core, said matrix extending generally through said core, substantially from side-to-side and top-to-bottom thereof;

an assembly of generally cylindrical thermionic cells emplaced within said matrix, said cells being disposed side-by-side and each of said cells containing a quantity of fissionable material, the fissionable material within said core aggregating a potentially critical mass;

reactivity control means for said critical mass, disposed in said reflector;

a multiplicity of generally sinusoidal coolant ducts extending through the reactor from side-to-side, through said core and said reflector, each of said ducts being of narrow rectangular cross-section and tracing an undulate path through said core, among and about said cells, a portion of the periphery of each of said cells being disposed in undulations of said ducts in heat conductive relationship therewith; and a multiplicity of sealed heat pipes, each contained entirely within said core, each heat pipe being enclosed by said matrix in heat conductive relationship to said cells and to said ducts, said heat pipes extending transversely of said coolant ducts and parallel to said cells.

* * * * *